(12) United States Patent
Liang et al.

(10) Patent No.: US 7,053,632 B1
(45) Date of Patent: May 30, 2006

(54) CIRCUIT AND METHOD FOR PREDICTING DEAD TIME

(75) Inventors: Shen-Yao Liang, Tainan (TW); Hung-Sung Chu, Tainan (TW); Kun-Cheng Hung, Tainan (TW)

(73) Assignee: Himax Technologies, Inc., Tainan (TW)

( * ) Notice: Subject to any disclaimer, the term of this patent is extended or adjusted under 35 U.S.C. 154(b) by 0 days.

(21) Appl. No.: 11/117,938

(22) Filed: Apr. 28, 2005

(30) Foreign Application Priority Data

Nov. 29, 2004 (TW) ............................... 93136704 A

(51) Int. Cl.
*G01R 27/26* (2006.01)
*H02J 7/04* (2006.01)

(52) U.S. Cl. ....................... 324/678; 324/433; 320/149
(58) Field of Classification Search ...................... None
See application file for complete search history.

(56) References Cited

U.S. PATENT DOCUMENTS 3,621,359 A * 11/1971 Schnegg ..................... 320/149
5,896,025 A * 4/1999 Yamaguchi et al. ........ 320/134

* cited by examiner

*Primary Examiner*—Vincent Q. Nguyen
(74) *Attorney, Agent, or Firm*—J.C. Patents

(57) ABSTRACT

A circuit for predicting the dead time is provided. The circuit includes a plurality of integrators, a plurality of comparators, and a logic circuit. Based on a reference signal provided externally, a first charging operation is delayed by a predetermined delay time during one period of the reference signal, such that the integrators maintain at a voltage level in a next period of the reference signal. Then, the integrators further perform another charging operation during the next period, and the charging voltage is compared with the maintained voltage value. When the charging voltage exceeds the maintained voltage, a reset signal is generated by the logic circuit.

20 Claims, 4 Drawing Sheets

CIRCUIT AND METHOD FOR PREDICTING DEAD TIME

CROSS-REFERENCE TO RELATED APPLICATION

This application claims the priority benefit of Taiwan application serial no. 93136704, filed on Nov. 29, 2004. All disclosure of the Taiwan application is incorporated herein by reference.

BACKGROUND OF THE INVENTION

1. Field of the Invention

The present invention relates to a circuit for predicting a dead time, and more particularly, to a circuit for predicting a dead time during a charging operation on the capacitors.

2. Description of the Related Art

In the design of the power supply, the turn-on voltage drop on the rectifier has a great impact on the efficiency of the whole power supply, and further affects the reliability of the entire system. Therefore, synchronous rectifiers utilizing the power transistors driven by low voltage have gained more weight now.

FIG. 1 schematically shows a circuit diagram of a conventional synchronous rectifier. As shown in FIG. 1, the synchronous rectifier comprises a plurality of power transistors. The synchronous rectifier is operated by a Pulse-Width Modulation (PWM) signal provided by the system, cooperating with a driving signal received on a gate of the power transistor. However, if both the driving signal and the PWM signal are received by the power transistor at the same time, a shoot through phenomenon would occur on the power transistor. The transistor Q4 in FIG. 1 is taken as an example. Before the turn during the operation period, if the signal for driving the transistor Q4 is continuously output, the transistor Q4 would be turned on, thus a current would pass through the transistor Q4, leading to the shoot through phenomenon.

In order to avoid the shoot through phenomenon mentioned above, a set of circuit for predicting a dead time is additionally configured in the controller of the synchronous rectifier in order to calculate the time for turning off the driving signal. FIG. 2 schematically shows a circuit diagram of a conventional circuit for calculating the dead time. As shown in the diagram, a finite states machine (FSM) 101 receives a PWM signal PWM and anticipation settings input from the external. The operations of the FSM 101 and the counters 107, 109 are controlled by an oscillator 103. These two counters 107, 109 are configured to count a period of the PWM signal and a dead time, and also to output a counting result to the FSM 101. The FSM 111 controls a controller 111 based on the counting result received from the counters 107, 109, so that the controller 111 can generate a reset signal at the timing of the dead time. Therefore, the signal for driving the gate of the transistor Q4 is turned off before the PWM signal is turned on and after obtaining a time point by deducting the dead time from the PWM period. When the reset signal is received by the synchronous rectifier, the driving signal is immediately turned off, thus it is possible to turn off the driving signal before the next PWM period begins, such that the driving signal no longer overlaps with the PWM signal and the shoot through phenomenon mentioned above can be prevented.

However, if the period of the PWM signal is calculated by the counter, usually a high frequency oscillator requiring a higher power is used to drive the counter, which would consume great power for the whole system.

SUMMARY OF THE INVENTION

Therefore, it is an object of the present invention to provide a circuit and a method for predicting a dead time. The circuit calculates a period of the signal by using a charging operation on capacitors, and anticipates a time point of the dead time, so that the shoot through phenomenon due to different driving signals received simultaneously by the system, can be avoided.

The present invention provides a circuit for predicting a dead time. The circuit comprises a plurality of integrators, a plurality of comparators, and a logic circuit. Specifically, the circuit mentioned above comprises a first integrator, a second integrator, and a first comparator. Wherein, the first integrator performs a charging operation during the $(N+1)^{th}$ period (where N is a positive integer) of a reference signal provided by an external source, and the second integrator performs a charging operation during the $N^{th}$ period of the reference signal and also maintains it at a fixed first voltage value during the $(N+1)^{th}$ period of the reference signal. The input terminals of the first comparator are coupled to the first integrator and the second integrator, respectively, and a first comparison result signal is generated when the charging voltage value of the first integrator exceeds the first voltage value. In addition, the circuit mentioned above further comprises a third integrator, a fourth integrator, and a second comparator. Wherein, the third integrator performs a charging operation during the $N^{th}$ period of the reference signal, and the fourth integrator performs a charging operation during the $(N-1)^{th}$ period of the reference signal and also maintains it at a fixed second voltage during the $N^{th}$ period. The input terminals of the second comparator are coupled to the third integrator and the fourth integrator, respectively, and a second comparison result signal is generated when the charging voltage value of the third integrator exceeds the second voltage value. The logic circuit is coupled to the output terminals of the first comparator and the second comparator for receiving the first and second comparison result signals, and generates a reset signal based on a result of a logical operation on the first and second comparison result signals. During the $N^{th}$ period and the $(N-1)^{th}$ period of the reference signal, the first integrator and the third integrator delay its charging operation for a predetermined period of time, and then begin the charging operation.

According to an embodiment of the present invention, the circuit for predicting the dead time further comprises a constant current source for charging the first integrator, the second integrator, the third integrator, and the fourth integrator, respectively.

According to an embodiment of the present invention, the circuit for predicting the dead time further comprises a first switch, a second switch, a third switch, and a fourth switch. Wherein, the first switch is coupled to the constant current source, the first integrator, and the second reference signal mentioned above, and the first switch provides a constant current to the first integrator based on the second reference signal. The second switch is coupled to the constant current source, the second integrator, and the second reverse reference signal mentioned above, and the second switch provides a constant current to the first integrator based on the second reverse reference signal.

The third switch is coupled to the constant current source, the third integrator, and the first reference signal mentioned above, and the third switch provides a constant current to the third integrator based on the first reference signal. In addition, the fourth switch is coupled to the constant current source, the fourth integrator, and the first reverse reference signal mentioned above, and the fourth switch provides a constant current to the fourth integrator based on the first reverse reference signal. Wherein, the first reverse reference signal and the second reverse reference signal have a reverse phase relationship.

According to an embodiment of the present invention, the first reference signal and the second reference signal are the result of adding the predetermined delay time to a reverse signal of the first reverse reference signal and a reverse signal of the second reverse reference signal. In addition, the first reverse reference signal and the second reverse reference signal are the signals having double frequency of the reference signal mentioned above.

According to an embodiment of the present invention, the first switch and the fourth switch mentioned above connect the constant current source to the first integrator and the fourth integrator during the $(N+1)^{th}$ period of the reference signal. The second switch and the third switch mentioned above connect the constant current source to the second integrator and the third integrator during the $N^{th}$ period of the reference signal.

According to an embodiment of the present invention, the predetermined delay time mentioned above may be configured to start at a rising edge of the reference signal. In addition, the predetermined delay time mentioned above may be controlled by an external resistor.

According to an embodiment of the present invention, all of the first, the second, the third, and the fourth integrators may be composed of a single capacitor, wherein the capacitance of the capacitor consisting the first integrator may be equal to that consisting the second integrator, and the capacitance of the capacitor consisting the third integrator may be equal to the that consisting the fourth integrator. In addition, the logic circuit may be composed of an OR gate, and the reference signal may be a PWM signal.

The present invention further provides a method for predicting a dead time. The method comprises the following steps. First, a reference signal is received from the outside. Then, a charging operation is performed on the second capacitor during the $N^{th}$ period (where N is a positive integer) of the reference signal after delaying for a predetermined delay time. A fixed voltage value is maintained on the second capacitor during the $(N+1)^{th}$ period of the reference signal, and a charging operation is performed on the second capacitor in order to continuously generate a charging voltage value. When the charging voltage value exceeds the fixed voltage value, a reset signal is generated to turn off an output signal, such that the output signal does not overlap with the reference signal.

According to an embodiment of the present invention, the predetermined delay time used in the method mentioned above may be configured to start at a rising edge of the reference signal. In addition, the reference signal mentioned above may be a PWM signal. Preferably, the capacitance of the first capacitor may be equal to that of the second capacitor. In addition, the first capacitor and the second capacitor are charged with a constant current source.

In summary, in the circuit for predicting the dead time provided by the present invention, a constant current source is used by the circuit to charge a set of capacitors, such that an entire period of the signal is recorded and the capacitance of the capacitor is maintained at a fixed value. Then, the circuit performs the same charging operation on another set of capacitors, and compares the voltage values of two different sets of capacitors with a comparator. When the voltage values of these two sets of capacitors are the same, a reset signal is generated by the comparator to turn off the driving signal in the system, such that the shoot through phenomenon due to different driving signals received simultaneously by the same system can be prevented.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

According to the present invention, integrators (e.g. a charging operation for capacitors) are used to calculate a period of a PWM signal so as to anticipate a time point of the dead time. Therefore, the high frequency oscillator used in the conventional technique can be replaced, so that power consumption is reduced. The circuit of the present invention can be applied to any system where the non-overlapping driving signals are used to drive elements therein.

Figure 3:
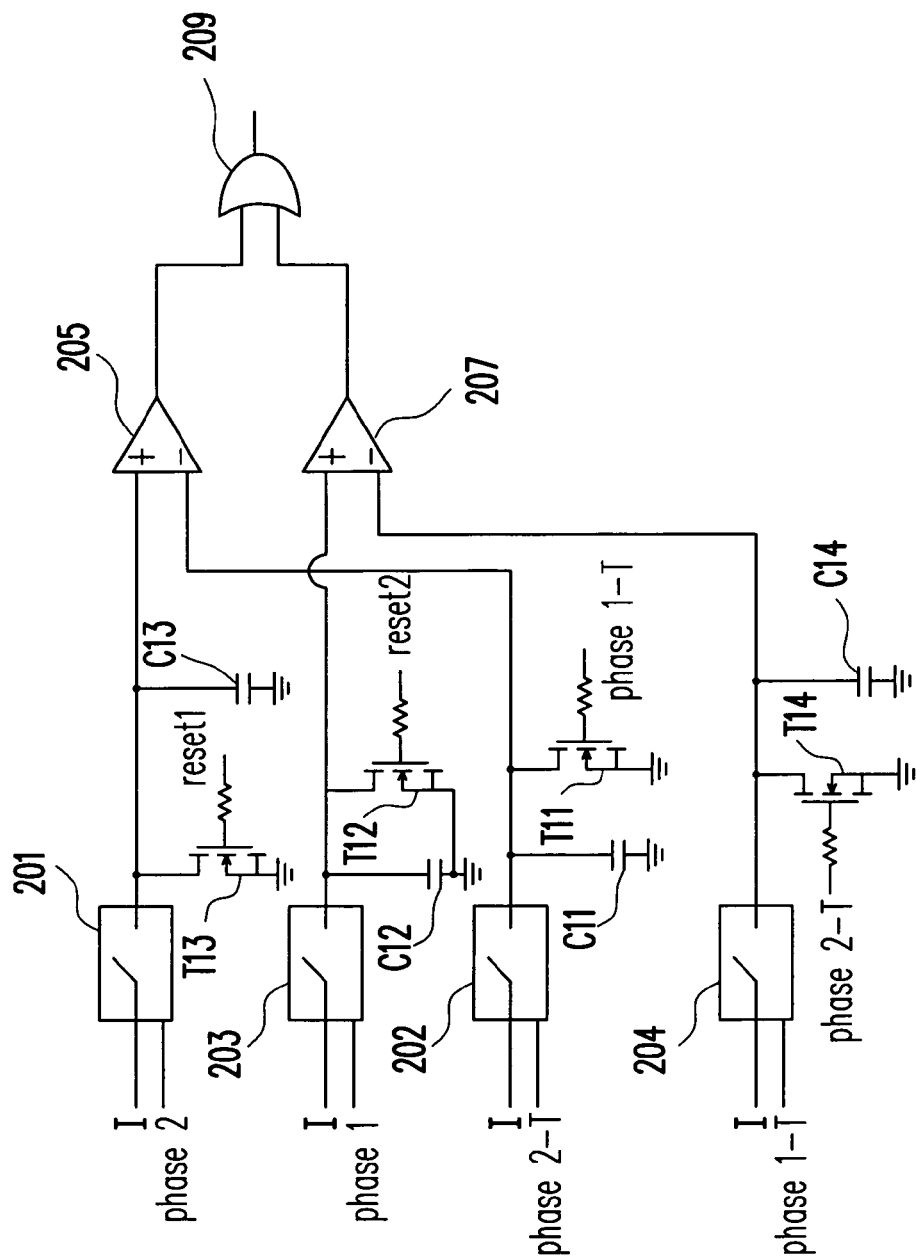
FIG. 3 schematically shows a block diagram of a circuit for predicting a dead time according to the present invention.

FIG. 3 schematically shows a block diagram of a circuit for predicting a dead time according to the present invention. The circuit of the present invention mainly comprises a first integrator C13, a second integrator C11, a third integrator C12, a fourth integrator C14, a first comparator 205, a second comparator 207, and a logic circuit 209. Wherein, the first integrator C13, the second integrator C11, the third integrator C12, and the fourth integrator C14 are charged with a constant current source I.

All of the integrators mentioned above may be composed of a single capacitor. Preferably, the capacitance of the capacitor consisting the first integrator C13 is equal to that consisting the second integrator C11, and the capacitance of the capacitor consisting the third integrator C12 is equal to that consisting the fourth integrator C14.

In addition, the constant current source I is coupled to the first integrator C13, the second integrator C11, the third integrator C12, and the fourth integrator C14 for performing a charging operation through a first switch 201, a second switch 202, a third switch 203, and a fourth switch 204, respectively.

Wherein, the first switch 201 determines whether to connect the constant current source I to the first integrator C13 based on a second reference signal phase2. The second switch 202 determines whether to connect the constant current source I to the second integrator C11 based on a second reverse reference signal phase2-T. The third switch 203 determines whether to connect the constant current source I to the third integrator C12 based on a first reference signal phase1. The fourth switch 204 determines whether to connect the constant current source I to the fourth integrator C14 based on a first reverse reference signal phase1-T. The first comparator 205 continuously compares the outputs of the first integrator C13 and the second integrator C11, so as to generate a first reset signal reset1. The second comparator 207 continuously compares the outputs of the third integrator C12 and the fourth integrator C14, so as to generate a second reset signal reset2.

Figure 4:
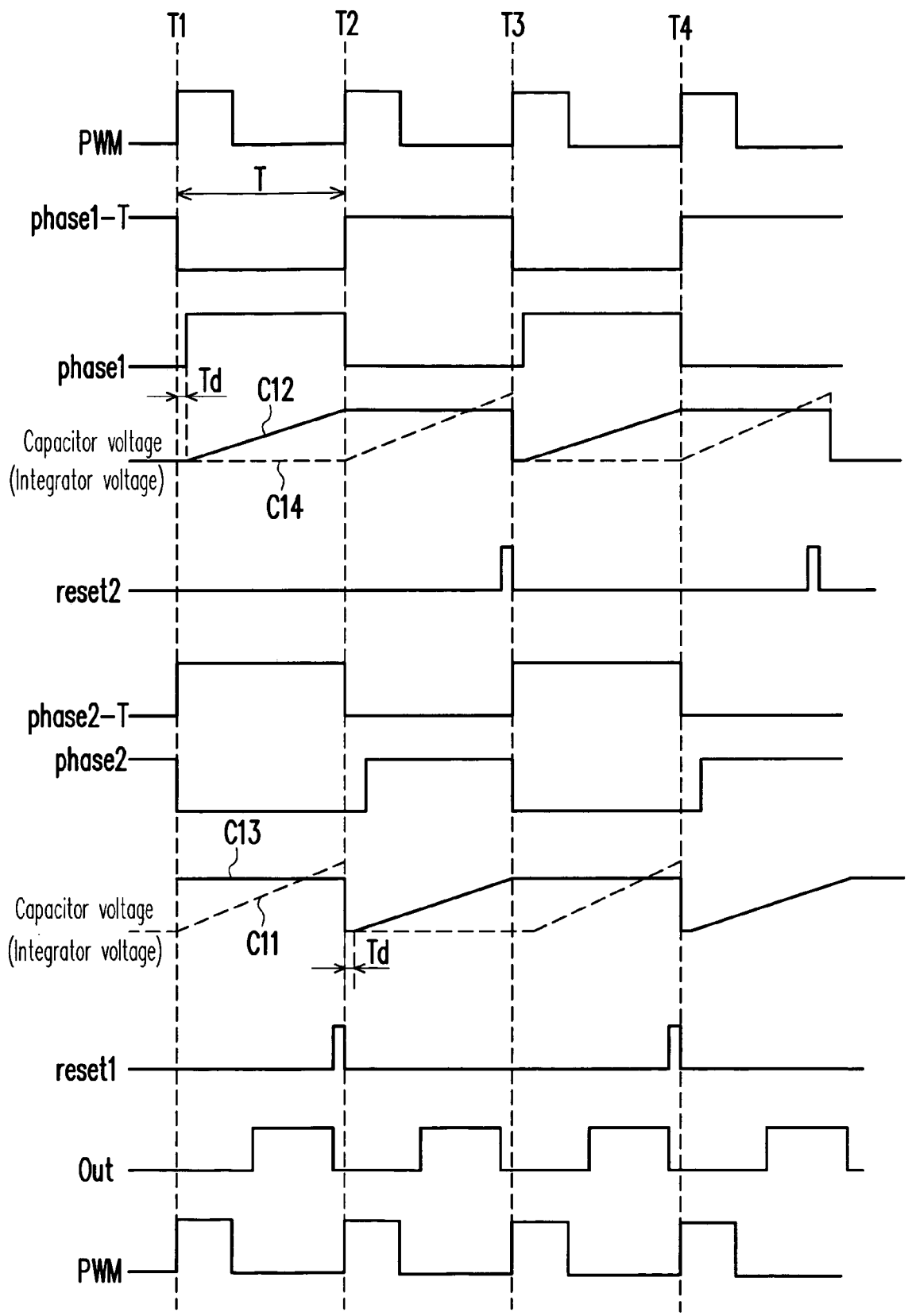
FIG. 4 schematically shows a timing diagram of the signals in a circuit for predicting a dead time according to the present invention.

FIG. 4 schematically shows a timing diagram of the signals in a circuit for predicting a dead time according to the present invention. The operation of the circuit for predicting the dead time provided by the present invention is described in detail, with reference to both FIG. 3 and FIG. 4 hereinafter. The circuit generates another non-overlapping output signal OUT by using an external PWM signal as its reference signal.

The first reverse reference signal phase1-T and the second reverse reference signal phase2-T mentioned above are the signals having double frequency of the PWM signal, and the first reverse reference signal phase1-T and the second reverse reference signal phase2-T are complementary to each other. In addition, the first reference signal phase1 and the first reverse reference signal phase1-T mentioned above basically are complementary to each other, and the second reference signal phase2 and the second reverse reference signal phase2-T mentioned above also are complementary to each other.

It is to be noted that the rising edge of the first reference signal phase1 is delayed for a predetermined period of time Td with respect to the first reverse reference signal phase1-T. Similarly, the rising edge of the second reference signal phase2 is delayed for a predetermined period of time Td with respect to the second reverse reference signal phase2-T. The predetermined period of time Td mentioned above is a dead-time, which is configured by an external circuit (e.g. resistors).

As shown in FIG. 4, where the time point T1 of the PWM signal is used as a starting point as an example. During a PWM period from the time point T1 to T2, the first reference signal phase1 and the first reverse reference signal phase1-T are the timing signals indicating the charging of the third integrator C12 and the charging of the fourth integrator C14, respectively. As mentioned above, the first reference signal phase1 and the first reverse reference signal phase1-T are basically complementary to each other. In other words, during a PWM period from time point T1 to T2, if the first reference signal phase1 is in a high voltage level, the third integrator C12 is charged. On the other hand, if the first reverse reference signal phase1-T is in a low voltage level, the fourth integrator C14 is not charged.

Meanwhile, the second reset signal reset2 is in a low voltage level, and the third pull-down transistor T12 is turned off, thus the third integrator C12 is charged with the constant current source I, and the second reverse reference signal phase2-T is in a high voltage level and the fourth pull-down transistor T14 is turned on, so that the output of the fourth integrator C14 is pulled down to the ground level.

From the time point T1, the first reference signal phase1 is delayed for a predetermined period of time Td with respect to the first reverse reference signal phase1-T. At the time point T+Td, the third switch 203 controlled by the first reference signal phase1 would switch the constant current source I to the third integrator C12, and the constant current source I starts to charge the third integrator C12. Meanwhile, the first reverse reference signal phase1-T is in a low voltage level and the fourth switch 204 dose not switch the constant current source I to the fourth integrator C14, thus the constant current source I does not charge the fourth integrator C14. Accordingly, the waveform of the voltages on the third integrator C12 and the fourth integrator C14 is presented by the waveform as shown on the fourth row in FIG. 4. The solid line indicates the waveform when the third integrator C12 is charged, and the dotted line indicates the waveform when the fourth integrator C14 is charged.

During the first PWM period in FIG. 4, the constant current source I starts charging the third integrator C12 after delaying for a time period Td from time point T1, and stops charging the third integrator C12 when the first PWM period is over (when the first reference signal phase1 becomes a low voltage). During the second PWM period, the second reset signal reset2 remains in a low voltage level, and the output of the third integrator C12 remains; that is, the voltage on the positive input terminal of the comparator 207 is maintained at a charging voltage VC12 of the third integrator C12.

The charging voltage of the third integrator C12 is calculated by the following equation:

$$VC12 = \frac{1}{C12}\int I \cdot dt = \frac{I}{C12} \times (T - Td),$$

where T is a PWM period.

In addition, during a second PWM period (T2 to T3), the first reverse reference signal phase1-T becomes a high voltage level. Meanwhile, the third switch 203 does not switch the constant current source I to the third integrator C12. On the contrary, the fourth switch 204 switches the constant current source I to the fourth integrator C14 and starts charging the fourth integrator C14. The charging of the fourth integrator C14 immediately begins at the time point T2 without delaying for a specific period of time. The charging voltage of the fourth integrator C14 is calculated by the following equation:

$$VC14 = \frac{1}{C14}\int I \cdot dt = \frac{I1}{C14} \times T,$$

where T is a PWM period.

The second comparator 207 continuously compares the outputs of the third integrator C12 and the fourth integrator C14, so as to obtain a second reset signal reset2. During the first PWM period, the output of the fourth integrator C14 is maintained at a ground level. In other words, the voltage on the positive input terminal of the second comparator 207 is always higher than the voltage on the negative input terminal (the output of the fourth integrator C14), thus the second reset signal reset2 is maintained at a low voltage level. During the second PWM period, the positive input voltage of the second comparator 207 is maintained at V12, the negative input voltage of the second comparator 207 is dynamically increased, and exceeds the positive input voltage before the second PWM period is over, since the charging time of the fourth integrator C14 is longer than the charging time of the third integrator C12.

Meanwhile, the second comparator 207 sends out a pulse. In other words, the second reset signal reset2 becomes a high voltage level to turn on the third pull-down transistor T12, such that the output of the third integrator C12 is pulled down to the ground level. In addition, when the second PWM period is over, the second reverse reference signal phase2-T becomes high voltage again to turn on the fourth pull-down transistor T14, such that the output of the fourth integrator C14 is pulled down to the ground level.

After the second reset signal reset2 sends out a pulse, the driving signal OUT for driving the external element (e.g. the transistor Q4 in FIG. 1) becomes high from low, so as to turn off the transistor Q4. It is known from description above, the driving signal OUT is turned off by the reset signal before the next PWM period begins. Therefore, the driving signal OUT does not overlap with the PWM signal, such that the shoot through phenomenon in the conventional technique can be avoided.

The operations of the first integrator C13, the second integrator C11, and the first comparator 205 are described hereinafter. Basically, the operations of the first integrator C13, the second integrator C11, and the first comparator 205 are the same as the operations of the third integrator C12, the fourth integrator C14, and the second comparator 207 mentioned above, and the only difference is a time lag of one PWM period of the operation timing.

During the second PWM period in FIG. 4, the second reference signal phase2 and the second reverse reference signal phase2-T indicate the charging of the first integrator C13 and the second integrator C11, respectively. As mentioned above, the second reference signal phase2 is basically complementary to the second reverse reference signal phase2-T. In other words, during the PWM period from time point T2 to T3, if the second reference signal phase2 is a high voltage level, the first integrator C13 is charged. On the other hand, if the second reverse reference signal phase2-T is a low voltage level, the second integrator C11 is not charged.

Meanwhile, the first reset signal reset1 is a low voltage level, and the first pull-down transistor T13 is turned off, so that the output of the first integrator C13 is charged by the constant current source I. The first reverse reference signal phase1-T is a high voltage level and the second pull-down transistor T11 is turned on, so that the output of the second integrator C11 is pulled down to the ground level.

From the time point T2, the second reference signal phase2 is sent out after delaying for a predetermined period of time Td with respect to the second reverse reference signal phase2-T, and is terminated on the time point T3 when a next PWM period starts. At the time point T2+Td, the first switch 201, which is controlled by the second reference signal phase2, switches the constant current source I to the first integrator C13, and the first integrator C13 is charged by the constant current source I. Meanwhile, the second reverse reference signal phase2-T is a low voltage level, the second switch 202 dose not switch the constant current source I to the second integrator C11, and the second integrator C11 is not charged by the constant current source I. Accordingly, the waveform of the voltages on the first integrator C13 and the second integrator C11 is represented by the waveform as shown on the 8$^{th}$ row in FIG. 4. Wherein, the solid line indicates the waveform when the first integrator C11 is charged, and the dotted line indicates the waveform when the second integrator C13 is charged.

During the second PWM period, the first integrator C13 is charged by the constant current source I after delaying a period of time Td from the time point T2, and the charging of the first integrator C13 is stopped when the second PWM period is over (when the second reference signal phase2 becomes low voltage). During the third PWM period (T3 to T4), the first reset signal reset1 is maintained at low voltage, and the output to of the first integrator C12 remains; that is, the voltage on the positive input terminal of the comparator 205 is maintained at the charging voltage VC13 of the first integrator C13.

In addition, during the third PWM period (T3 to T4), the second reference signal phase2 becomes a low voltage level. Meanwhile, the first switch 201 does not switch the constant current source I to the third integrator C12. On the other hand, the second switch 202 switches the constant current source I to the second integrator C11, and starts to charge the second integrator C11. Similarly, the charging of the second integrator C11 is immediately started on time point T3 without delaying for a specific period of time.

The first comparator 205 continuously compares the outputs of the first integrator C13 and the second integrator C11, so as to obtain a first reset signal reset1. During the second PWM period, the output of the second integrator C11 is maintained at the ground level; that is, the voltage on the positive input terminal of the first comparator 205 is always higher than the voltage on the negative input terminal (the output of the second integrator C11), such that the second reset signal reset2 is maintained at a low voltage level.

During the third PWM period, the voltage on the positive input terminal of the first comparator 205 is maintained at V13, and the voltage on the negative input terminal of the first comparator 205 is dynamically increased, and since the charging time of the second integrator C11 is longer than the charging time of the first integrator C13, the voltage on the negative input terminal of the first comparator 205 will exceed the positive input voltage before the third PWM period is over.

Meanwhile, the first comparator 205 sends out a pulse. In other words, the first reset signal reset1 becomes a high voltage to turn on the first pull-down transistor T13, so that the output of the first integrator C13 is pulled down to the ground level. In addition, when the third PWM period is over, the first reverse reference signal phase1-T becomes a high voltage again to turn on the second pull-down transistor T13, so that the output of the second integrator C11 is pulled down to the ground level.

After the first reset signal reset1 sends out a pulse, the driving signal OUT for driving the external element (e.g. the transistor Q4 in FIG. 1) is changed from the high to the low voltage level, so as to turn off the transistor Q4.

It is known from the description above, the driving signal OUT is turned off by the reset signal before the next PWM period begins. Therefore, the driving signal OUT does not overlap with the PWM signal, such that the shoot through phenomenon in the conventional technique can be avoided.

In addition, an entire operation period of two sets of circuits in the present invention is used as the two periods of the PWM signal for the reference signal respectively, and their operations are complementary to each other. For example, a first set of circuit comprising the third integrator C12, the fourth integrator C14, and the comparator 207 performs the charging operation (charging the third integrator C12) based on the reference signal during the odd number of periods of the PWM signal, and performs the voltage comparing operation (comparing the voltages VC12 and VC14) during the even number of periods of the PWM signal. On the contrary, a second set of circuit comprising the first integrator C13, the second integrator C14, and the comparator 205 performs the charging operation (charging the second integrator C11) for the reference signal during the even number of periods of the PWM signal, and performs the voltage comparing operation (comparing the voltages VC11 and VC13) during the odd number of periods of the PWM signal.

The first comparator 205 outputs a high level pulse of the first reset signal reset1 when the voltage VC11 exceeds the voltage VC13, and maintains at the low level in the rest of the time. The second comparator 207 outputs a high level pulse of the second reset signal reset2 when the voltage VC14 exceeds the voltage VC12, and maintains at the low level in the rest of the time. A reset signal is generated from a logic circuit 209, such as an OR gate during each PWM period, so as to turn off the driving signal OUT. With the circuit and the operation thereof mentioned above, the high level parts of the driving signal OUT and the PWM signal would not overlap with each other.

Figure 1:
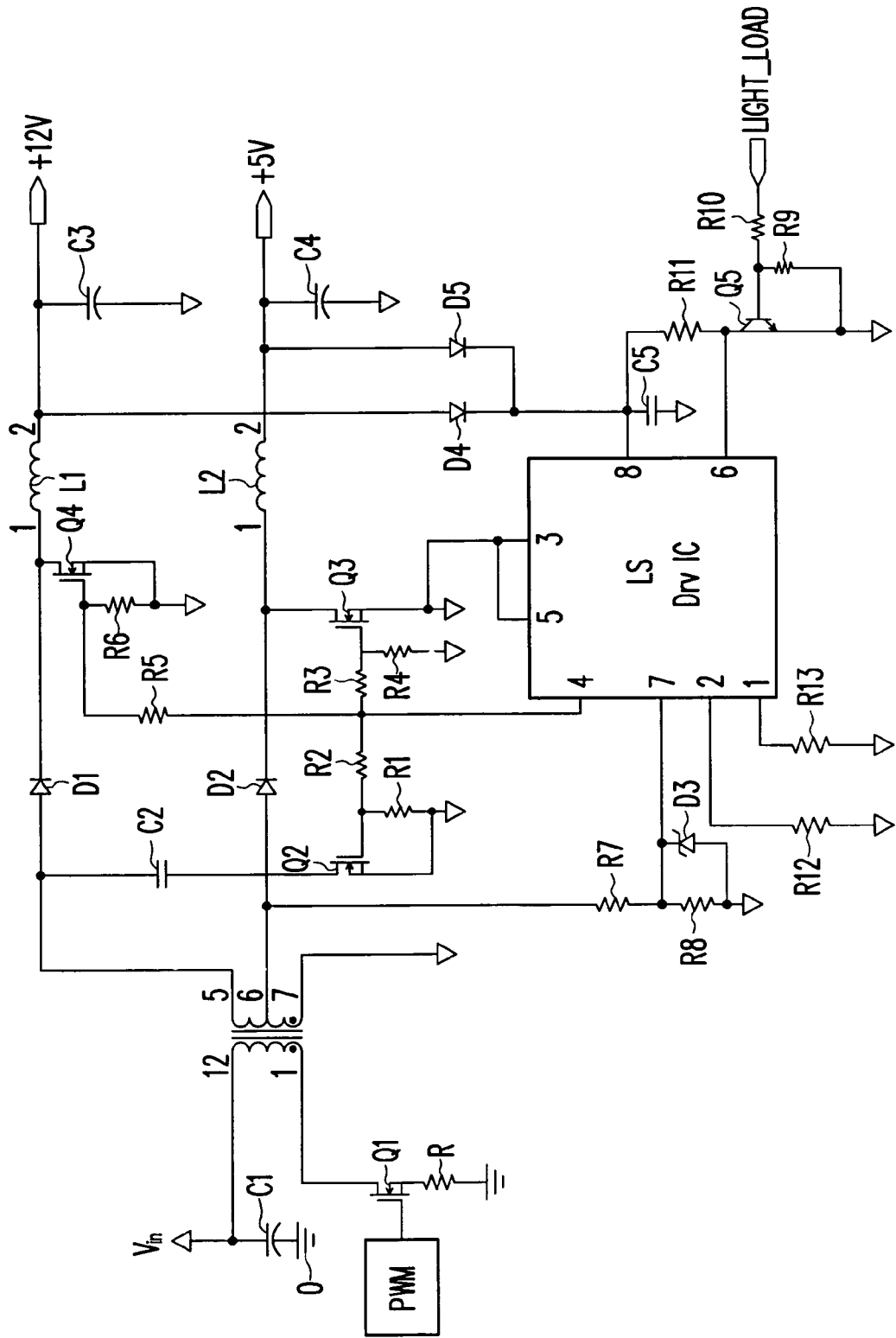
FIG. 1 schematically shows a circuit diagram of a conventional synchronous rectifier.
Figure 2:
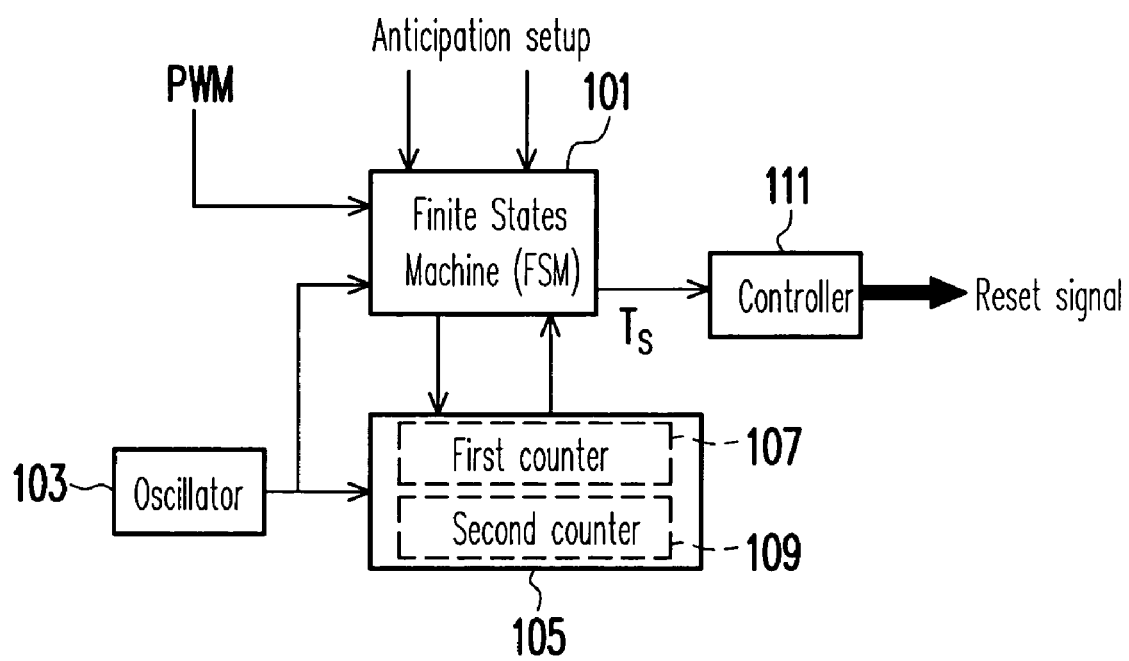
FIG. 2 schematically shows a block diagram of a conventional circuit for predicting a dead time.

When the circuit is applied on the synchronous rectifier shown in FIG. 1, the shoot through phenomenon due to the overlapping control signals in the conventional technique can be prevented. In addition, since the point of the dead time is estimated by performing the charging operation on the capacitor in the present invention, the control signal OUT is turned off before the next PWM signal starts. Accordingly, the conventional high frequency oscillator is no longer used in such case, such that the system power loss is effectively reduced.

In summary, the conventional digital counter is replaced with the integrators in the present invention in order to record the PWM period and to anticipate the dead time. It is guaranteed that the shoot through phenomenon would not occur in this circuit configuration under a stable state. Even when the frequency is not stable or the PWM operation period is variable, some logic circuits may be added to the output driver in order to avoid the shoot through phenomenon. In addition, since the conventional high frequency oscillator is not required, the power consumption in the present invention is much less than that when the digital circuit is used.

The embodiments mentioned above provide an application of the synchronous rectifier, however the present invention is not limited thereto. The circuit of the present invention can be applied to any system which requires two non-overlapping control signals.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A circuit for predicting a dead time, comprising:
a first integrator for performing a charging operation during a $(N+1)^{th}$ period (where N is a positive integer) of an externally provided reference signal;
a second integrator for performing a charging operation during a $N^{th}$ period of the reference signal, and maintaining at a first voltage value during the $(N+1)^{th}$ period;
a first comparator having input terminals coupled to the first integrator and the second integrator respectively, and generating a first comparison result signal when a charging voltage value of the first integrator exceeds the first voltage value;
a third integrator for performing a charging operation during the $N^{th}$ period of the reference signal;
a fourth integrator for performing a charging operation during a $(N-1)^{th}$ period of the reference signal, and maintaining at a second voltage value during the $N^{th}$ period of the reference signal;
a second comparator having input terminals coupled to the third integrator and the fourth integrator respectively, and generating a second comparison result signal when a charging voltage value of the third integrator exceeds the second voltage value; and
a logic circuit coupled to an output of the first comparator and an output of the second comparator for receiving the first comparison result signal and the second comparison result signal, and generating a reset signal based on a result of a logical operation on the first comparison result signal and the second comparison result signal,
wherein, the charging operation is performed by the first integrator and the third integrator during the $N^{th}$ period and the $(N-1)^{th}$ period of the reference signal after delaying for a predetermined delay time.

2. The circuit for predicting the dead time of claim 1, wherein the predetermined delay time is configured to start at a rising edge of the reference signal.

3. The circuit for predicting the dead time of claim 1, wherein the circuit for predicting the dead time further comprises a constant current source for charging the first integrator, the second integrator, the third integrator, and the fourth integrator.

4. The circuit for predicting the dead time of claim 3, wherein the circuit for predicting the dead time further comprises:
a first switch coupled to the constant current source, the first integrator, and a second reference signal for providing the constant current source to the first integrator based on the second reference signal;
a second switch coupled to the constant current source, the second integrator, and a second reverse reference signal for providing the constant current source to the second integrator based on the second reverse reference signal;
a third switch coupled to the constant current source, the third integrator, and a first reference signal for providing the constant current source to the third integrator based on the first reference signal; and
a fourth switch coupled to the constant current source, the fourth integrator, and a first reverse reference signal for providing the constant current source to the fourth integrator based on the first reverse reference signal;
wherein, the first reverse reference signal and the second reverse reference signal have a reverse phase relationship.

5. The circuit for predicting the dead time of claim 4, wherein the first reference signal is obtained from adding a reverse signal of the first reverse reference signal to the predetermined delay time.

6. The circuit for predicting the dead time of claim 4, wherein the second reference signal is obtained from adding a reverse signal of the second reverse reference signal to the predetermined delay time.

7. The circuit for predicting the dead time of claim 4, wherein the first reverse reference signal and the second reverse reference signal are the signals having double frequency of the reference signal.

8. The circuit for predicting the dead time of claim 4, wherein the first switch and the fourth switch connect the constant current source to the first integrator and the fourth integrator during the $(N+1)^{th}$ period of the reference signal.

9. The circuit for predicting the dead time of claim 4, wherein the second switch and the third switch connect the constant current source to the second integrator and the third integrator during the $N^{th}$ period of the reference signal.

10. The circuit for predicting the dead time of claim 1, wherein the predetermined delay time is controlled by an external resistor.

11. The circuit for predicting the dead time of claim 1, wherein the first integrator, the second integrator, the third integrator, and the fourth integrator are all composed of a single capacitor.

12. The circuit for predicting the dead time of claim 11, wherein a capacitance of the capacitor consisting the first integrator is equal to a capacitance of the capacitor consisting the second integrator.

13. The circuit for predicting the dead time of claim 11, wherein a capacitance of the capacitor consisting the third integrator is equal to a capacitance of the capacitor consisting the fourth integrator.

14. The circuit for predicting the dead time of claim 1, wherein the logic circuit is a logic OR gate.

15. The circuit for predicting the dead time of claim 1, wherein the reference signal is a Pulse-Width Modulation (PWM) signal.

16. A method for predicting a dead time, comprising:

receiving a reference signal from the outside;

charging a first capacitor during a $N^{th}$ period (where N is a positive integer) of the reference signal after delaying for a predetermined delay time;

maintaining the first capacitor at a fixed voltage value during a $(N+1)^{th}$ period of to the reference signal, and charging a second capacitor for continuously generating a charging voltage value; and generating a reset signal when the charging voltage value exceeds the fixed voltage value for turning off an output signal, such that the output signal does not overlap with the reference signal.

17. The method for predicting the dead time of claim 16, wherein the predetermined delay time is configured to start at a rising edge of the reference signal.

18. The method for predicting the dead time of claim 16, wherein the reference signal is a Pulse-Width Modulation (PWM) signal.

19. The method for predicting the dead time of claim 16, wherein a capacitance of the first capacitor is equal to a capacitance of the second capacitor.

20. The method for predicting the dead time of claim 16, wherein the first capacitor and the second capacitor are charged by a constant current source, respectively.

* * * * *